US009087367B2

(12) United States Patent
Chang et al.

(10) Patent No.: US 9,087,367 B2
(45) Date of Patent: Jul. 21, 2015

(54) DETERMINING DESIGN COORDINATES FOR WAFER DEFECTS

(75) Inventors: Ellis Chang, Saratoga, CA (US); Michael J. Van Riet, Sunnyvale, CA (US); Allen Park, San Jose, CA (US); Khurram Zafar, San Jose, CA (US); Santosh Bhattacharyya, San Jose, CA (US)

(73) Assignee: KLA-Tencor Corp., Milpitas, CA (US)

(*) Notice: Subject to any disclaimer, the term of this patent is extended or adjusted under 35 U.S.C. 154(b) by 100 days.

(21) Appl. No.: 13/601,891

(22) Filed: Aug. 31, 2012

(65) Prior Publication Data

US 2013/0064442 A1 Mar. 14, 2013

Related U.S. Application Data

(60) Provisional application No. 61/534,104, filed on Sep. 13, 2011.

(51) Int. Cl.
G06K 9/62 (2006.01)
G06T 7/00 (2006.01)

(52) U.S. Cl.
CPC .............. *G06T 7/001* (2013.01); *G06T 7/0044* (2013.01); *G06T 2207/30148* (2013.01)

(58) Field of Classification Search
CPC ........................................................ G06K 9/62
USPC ........................................................ 382/149
See application file for complete search history.

(56) References Cited

U.S. PATENT DOCUMENTS

| 3,495,269 | A | 2/1970 | Mutschler et al. |
|---|---|---|---|
| 3,496,352 | A | 2/1970 | Jugle |
| 3,909,602 | A | 9/1975 | Micka |
| 4,015,203 | A | 3/1977 | Verkuil |
| 4,247,203 | A | 1/1981 | Levy et al. |

(Continued)

FOREIGN PATENT DOCUMENTS

| CN | 1339140 | 3/2002 |
|---|---|---|
| CN | 1398348 | 2/2003 |

(Continued)

OTHER PUBLICATIONS

Budd et al., "A New Mask Evaluation Tool, the Microlithography Simulation Microscope Aerial Image Measurement System," SPIE vol. 2197, 1994, pp. 530-540.

(Continued)

*Primary Examiner* — Stephen R Koziol
*Assistant Examiner* — Delomia Gilliard
(74) *Attorney, Agent, or Firm* — Ann Marie Mewherter (57) ABSTRACT

Methods and systems for determining design coordinates for defects detected on a wafer are provided. One method includes aligning a design for a wafer to defect review tool images for defects detected in multiple swaths on the wafer by an inspection tool, determining a position of each of the defects in design coordinates based on results of the aligning, separately determining a defect position offset for each of the multiple swaths based on the swath in which each of the defects was detected (swath correction factor), the design coordinates for each of the defects, and a position for each of the defects determined by the inspection tool, and determining design coordinates for the other defects detected in the multiple swaths by the inspection tool by applying the appropriate swath correction factor to those defects.

27 Claims, 2 Drawing Sheets

(56) References Cited

U.S. PATENT DOCUMENTS

| | | |
|---|---|---|
| 4,347,001 A | 8/1982 | Levy et al. |
| 4,378,159 A | 3/1983 | Galbraith |
| 4,448,532 A | 5/1984 | Joseph et al. |
| 4,475,122 A | 10/1984 | Green |
| 4,532,650 A | 7/1985 | Wihl et al. |
| 4,555,798 A | 11/1985 | Broadbent, Jr. et al. |
| 4,578,810 A | 3/1986 | MacFarlane et al. |
| 4,579,455 A | 4/1986 | Levy et al. |
| 4,595,289 A | 6/1986 | Feldman et al. |
| 4,599,558 A | 7/1986 | Castellano, Jr. et al. |
| 4,633,504 A | 12/1986 | Wihl |
| 4,641,353 A | 2/1987 | Kobayashi |
| 4,641,967 A | 2/1987 | Pecen |
| 4,734,721 A | 3/1988 | Boyer et al. |
| 4,748,327 A | 5/1988 | Shinozaki et al. |
| 4,758,094 A | 7/1988 | Wihl et al. |
| 4,766,324 A | 8/1988 | Saadat et al. |
| 4,799,175 A | 1/1989 | Sano et al. |
| 4,805,123 A | 2/1989 | Specht et al. |
| 4,812,756 A | 3/1989 | Curtis et al. |
| 4,814,829 A | 3/1989 | Kosugi et al. |
| 4,817,123 A | 3/1989 | Sones et al. |
| 4,845,558 A | 7/1989 | Tsai et al. |
| 4,877,326 A | 10/1989 | Chadwick et al. |
| 4,926,489 A | 5/1990 | Danielson et al. |
| 4,928,313 A | 5/1990 | Leonard et al. |
| 5,046,109 A | 9/1991 | Fujimori et al. |
| 5,124,927 A | 6/1992 | Hopewell et al. |
| 5,189,481 A | 2/1993 | Jann et al. |
| 5,355,212 A | 10/1994 | Wells et al. |
| 5,444,480 A | 8/1995 | Sumita |
| 5,453,844 A | 9/1995 | George et al. |
| 5,481,624 A | 1/1996 | Kamon |
| 5,485,091 A | 1/1996 | Verkuil |
| 5,497,381 A | 3/1996 | O'Donoghue et al. |
| 5,528,153 A | 6/1996 | Taylor et al. |
| 5,544,256 A | 8/1996 | Brecher et al. |
| 5,563,702 A | 10/1996 | Emery et al. |
| 5,572,598 A | 11/1996 | Wihl et al. |
| 5,578,821 A | 11/1996 | Meisberger et al. |
| 5,594,247 A | 1/1997 | Verkuil et al. |
| 5,608,538 A | 3/1997 | Edgar et al. |
| 5,619,548 A | 4/1997 | Koppel |
| 5,621,519 A | 4/1997 | Frost et al. |
| 5,644,223 A | 7/1997 | Verkuil |
| 5,650,731 A | 7/1997 | Fung et al. |
| 5,661,408 A | 8/1997 | Kamieniecki et al. |
| 5,689,614 A | 11/1997 | Gronet et al. |
| 5,694,478 A | 12/1997 | Braier et al. |
| 5,696,835 A | 12/1997 | Hennessey et al. |
| 5,703,969 A | 12/1997 | Hennessey et al. |
| 5,737,072 A | 4/1998 | Emery et al. |
| 5,742,658 A | 4/1998 | Tiffin et al. |
| 5,754,678 A | 5/1998 | Hawthorne et al. |
| 5,767,691 A | 6/1998 | Verkuil |
| 5,767,693 A | 6/1998 | Verkuil |
| 5,771,317 A | 6/1998 | Edgar |
| 5,773,989 A | 6/1998 | Edelman et al. |
| 5,774,179 A | 6/1998 | Chevrette et al. |
| 5,795,685 A | 8/1998 | Liebmann et al. |
| 5,822,218 A | 10/1998 | Moosa et al. |
| 5,831,865 A | 11/1998 | Berezin et al. |
| 5,834,941 A | 11/1998 | Verkuil |
| 5,852,232 A | 12/1998 | Samsavar et al. |
| 5,866,806 A | 2/1999 | Samsavar et al. |
| 5,874,733 A | 2/1999 | Silver et al. |
| 5,884,242 A | 3/1999 | Meier et al. |
| 5,889,593 A | 3/1999 | Bareket |
| 5,917,332 A | 6/1999 | Chen et al. |
| 5,932,377 A | 8/1999 | Ferguson et al. |
| 5,940,458 A | 8/1999 | Suk |
| 5,948,972 A | 9/1999 | Samsavar et al. |
| 5,955,661 A | 9/1999 | Samsavar et al. |
| 5,965,306 A | 10/1999 | Mansfield et al. |
| 5,978,501 A | 11/1999 | Badger et al. |
| 5,980,187 A | 11/1999 | Verhovsky |
| 5,986,263 A | 11/1999 | Hiroi et al. |
| 5,991,699 A | 11/1999 | Kulkarni et al. |
| 5,999,003 A | 12/1999 | Steffan et al. |
| 6,011,404 A | 1/2000 | Ma et al. |
| 6,014,461 A | 1/2000 | Hennessey et al. |
| 6,040,911 A | 3/2000 | Nozaki et al. |
| 6,040,912 A | 3/2000 | Zika et al. |
| 6,052,478 A | 4/2000 | Wihl et al. |
| 6,060,709 A | 5/2000 | Verkuil et al. |
| 6,072,320 A | 6/2000 | Verkuil |
| 6,076,465 A | 6/2000 | Vacca et al. |
| 6,078,738 A | 6/2000 | Garza et al. |
| 6,091,257 A | 7/2000 | Verkuil et al. |
| 6,091,846 A | 7/2000 | Lin et al. |
| 6,097,196 A | 8/2000 | Verkuil et al. |
| 6,097,887 A | 8/2000 | Hardikar et al. |
| 6,104,206 A | 8/2000 | Verkuil |
| 6,104,835 A | 8/2000 | Han |
| 6,117,598 A | 9/2000 | Imai |
| 6,121,783 A | 9/2000 | Horner et al. |
| 6,122,017 A | 9/2000 | Taubman |
| 6,122,046 A | 9/2000 | Almogy |
| 6,137,570 A | 10/2000 | Chuang et al. |
| 6,141,038 A | 10/2000 | Young et al. |
| 6,146,627 A | 11/2000 | Muller et al. |
| 6,171,737 B1 | 1/2001 | Phan et al. |
| 6,175,645 B1 | 1/2001 | Elyasaf et al. |
| 6,184,929 B1 | 2/2001 | Noda et al. |
| 6,184,976 B1 | 2/2001 | Park et al. |
| 6,191,605 B1 | 2/2001 | Miller et al. |
| 6,201,999 B1 | 3/2001 | Jevtic |
| 6,202,029 B1 | 3/2001 | Verkuil et al. |
| 6,205,239 B1 | 3/2001 | Lin et al. |
| 6,215,551 B1 | 4/2001 | Nikoonahad et al. |
| 6,224,638 B1 | 5/2001 | Jevtic et al. |
| 6,233,719 B1 | 5/2001 | Hardikar et al. |
| 6,246,787 B1 | 6/2001 | Hennessey et al. |
| 6,248,485 B1 | 6/2001 | Cuthbert |
| 6,248,486 B1 | 6/2001 | Dirksen et al. |
| 6,259,960 B1 | 7/2001 | Inokuchi |
| 6,266,437 B1 | 7/2001 | Eichel et al. |
| 6,267,005 B1 | 7/2001 | Samsavar et al. |
| 6,268,093 B1 | 7/2001 | Kenan et al. |
| 6,272,236 B1 | 8/2001 | Pierrat et al. |
| 6,282,309 B1 | 8/2001 | Emery |
| 6,292,582 B1 | 9/2001 | Lin et al. |
| 6,295,374 B1 | 9/2001 | Robinson et al. |
| 6,324,298 B1 | 11/2001 | O'Dell et al. |
| 6,344,640 B1 | 2/2002 | Rhoads |
| 6,363,166 B1 | 3/2002 | Wihl et al. |
| 6,366,687 B1 | 4/2002 | Aloni et al. |
| 6,373,975 B1 | 4/2002 | Bula et al. |
| 6,388,747 B2 | 5/2002 | Nara et al. |
| 6,393,602 B1 | 5/2002 | Atchison et al. |
| 6,407,373 B1 | 6/2002 | Dotan |
| 6,415,421 B2 | 7/2002 | Anderson et al. |
| 6,445,199 B1 | 9/2002 | Satya et al. |
| 6,451,690 B1 | 9/2002 | Matsumoto et al. |
| 6,459,520 B1 | 10/2002 | Takayama |
| 6,466,314 B1 | 10/2002 | Lehman |
| 6,466,315 B1 | 10/2002 | Karpol et al. |
| 6,470,489 B1 | 10/2002 | Chang et al. |
| 6,483,938 B1 | 11/2002 | Hennessey et al. |
| 6,513,151 B1 | 1/2003 | Erhardt et al. |
| 6,526,164 B1 | 2/2003 | Mansfield et al. |
| 6,529,621 B1 | 3/2003 | Glasser et al. |
| 6,535,628 B2 | 3/2003 | Smargiassi et al. |
| 6,539,106 B1 | 3/2003 | Gallarda et al. |
| 6,569,691 B1 | 5/2003 | Jastrzebski et al. |
| 6,581,193 B1 | 6/2003 | McGhee et al. |
| 6,593,748 B1 | 7/2003 | Halliyal et al. |
| 6,597,193 B2 | 7/2003 | Lagowski et al. |
| 6,602,728 B1 | 8/2003 | Liebmann et al. |
| 6,608,681 B2 | 8/2003 | Tanaka et al. |
| 6,614,520 B1 | 9/2003 | Bareket et al. |
| 6,631,511 B2 | 10/2003 | Haffner et al. |
| 6,636,301 B1 | 10/2003 | Kvamme et al. |
| 6,642,066 B1 | 11/2003 | Halliyal et al. |

(56) References Cited

U.S. PATENT DOCUMENTS

| | | |
|---|---|---|
| 6,658,640 B2 | 12/2003 | Weed |
| 6,665,065 B1 | 12/2003 | Phan et al. |
| 6,670,082 B2 | 12/2003 | Liu et al. |
| 6,680,621 B2 | 1/2004 | Savtchouk |
| 6,691,052 B1 | 2/2004 | Maurer |
| 6,701,004 B1 | 3/2004 | Shykind et al. |
| 6,718,526 B1 | 4/2004 | Eldredge et al. |
| 6,721,695 B1 | 4/2004 | Chen et al. |
| 6,734,696 B2 | 5/2004 | Horner et al. |
| 6,738,954 B1 | 5/2004 | Allen et al. |
| 6,748,103 B2 | 6/2004 | Glasser et al. |
| 6,751,519 B1 | 6/2004 | Satya et al. |
| 6,753,954 B2 | 6/2004 | Chen |
| 6,757,645 B2 | 6/2004 | Chang et al. |
| 6,759,655 B2 | 7/2004 | Nara et al. |
| 6,771,806 B1 | 8/2004 | Satya et al. |
| 6,775,818 B2 | 8/2004 | Taravade et al. |
| 6,777,147 B1 | 8/2004 | Fonseca et al. |
| 6,777,676 B1 | 8/2004 | Wang et al. |
| 6,778,695 B1 | 8/2004 | Schellenberg et al. |
| 6,779,159 B2 | 8/2004 | Yokoyama et al. |
| 6,784,446 B1 | 8/2004 | Phan et al. |
| 6,788,400 B2 | 9/2004 | Chen |
| 6,789,032 B2 | 9/2004 | Barbour et al. |
| 6,803,554 B2 | 10/2004 | Ye et al. |
| 6,806,456 B1 | 10/2004 | Ye et al. |
| 6,807,503 B2 | 10/2004 | Ye et al. |
| 6,813,572 B2 | 11/2004 | Satya et al. |
| 6,820,028 B2 | 11/2004 | Ye et al. |
| 6,828,542 B2 | 12/2004 | Ye et al. |
| 6,842,225 B1 | 1/2005 | Irie |
| 6,859,746 B1 | 2/2005 | Stirton |
| 6,879,403 B2 | 4/2005 | Freifeld |
| 6,879,924 B2 | 4/2005 | Ye et al. |
| 6,882,745 B2 | 4/2005 | Brankner et al. |
| 6,884,984 B2 | 4/2005 | Ye et al. |
| 6,886,153 B1 | 4/2005 | Bevis |
| 6,892,156 B2 | 5/2005 | Ye et al. |
| 6,902,855 B2 | 6/2005 | Peterson et al. |
| 6,906,305 B2 | 6/2005 | Pease et al. |
| 6,918,101 B1 | 7/2005 | Satya et al. |
| 6,919,957 B2 | 7/2005 | Nikoonahad et al. |
| 6,937,753 B1 | 8/2005 | O'Dell et al. |
| 6,948,141 B1 | 9/2005 | Satya et al. |
| 6,959,255 B2 | 10/2005 | Ye et al. |
| 6,966,047 B1 | 11/2005 | Glasser |
| 6,969,837 B2 | 11/2005 | Ye et al. |
| 6,969,864 B2 | 11/2005 | Ye et al. |
| 6,983,060 B1 | 1/2006 | Martinent-Catalot et al. |
| 6,988,045 B2 | 1/2006 | Purdy |
| 6,990,385 B1 | 1/2006 | Smith et al. |
| 7,003,755 B2 | 2/2006 | Pang et al. |
| 7,003,758 B2 | 2/2006 | Ye et al. |
| 7,012,438 B1 | 3/2006 | Miller et al. |
| 7,026,615 B2 | 4/2006 | Takane et al. |
| 7,027,143 B1 | 4/2006 | Stokowski et al. |
| 7,030,966 B2 | 4/2006 | Hansen |
| 7,030,997 B2 | 4/2006 | Neureuther et al. |
| 7,053,355 B2 | 5/2006 | Ye et al. |
| 7,061,625 B1 | 6/2006 | Hwang et al. |
| 7,071,833 B2 | 7/2006 | Nagano et al. |
| 7,103,484 B1 | 9/2006 | Shi et al. |
| 7,106,895 B1 | 9/2006 | Goldberg et al. |
| 7,107,517 B1 | 9/2006 | Suzuki et al. |
| 7,107,571 B2 | 9/2006 | Chang et al. |
| 7,111,277 B2 | 9/2006 | Ye et al. |
| 7,114,143 B2 | 9/2006 | Hanson et al. |
| 7,114,145 B2 | 9/2006 | Ye et al. |
| 7,117,477 B2 | 10/2006 | Ye et al. |
| 7,117,478 B2 | 10/2006 | Ye et al. |
| 7,120,285 B1 | 10/2006 | Spence |
| 7,120,895 B2 | 10/2006 | Ye et al. |
| 7,123,356 B1 | 10/2006 | Stokowski et al. |
| 7,124,386 B2 | 10/2006 | Smith et al. |
| 7,133,548 B2 | 11/2006 | Kenan et al. |
| 7,135,344 B2 | 11/2006 | Nehmadi et al. |
| 7,136,143 B2 | 11/2006 | Smith |
| 7,152,215 B2 | 12/2006 | Smith et al. |
| 7,162,071 B2 | 1/2007 | Hung et al. |
| 7,170,593 B2 | 1/2007 | Honda et al. |
| 7,171,334 B2 | 1/2007 | Gassner |
| 7,174,520 B2 | 2/2007 | White et al. |
| 7,194,709 B2 | 3/2007 | Brankner |
| 7,207,017 B1 | 4/2007 | Tabery et al. |
| 7,231,628 B2 | 6/2007 | Pack et al. |
| 7,236,847 B2 | 6/2007 | Marella |
| 7,271,891 B1 | 9/2007 | Xiong et al. |
| 7,379,175 B1 | 5/2008 | Stokowski et al. |
| 7,383,156 B2 | 6/2008 | Matsusita et al. |
| 7,386,839 B1 | 6/2008 | Golender et al. |
| 7,388,979 B2 | 6/2008 | Sakai et al. |
| 7,418,124 B2 | 8/2008 | Peterson et al. |
| 7,424,145 B2 | 9/2008 | Horie et al. |
| 7,440,093 B1 | 10/2008 | Xiong et al. |
| 7,570,796 B2 | 8/2009 | Zafar et al. |
| 7,676,077 B2 | 3/2010 | Kulkarni et al. |
| 7,683,319 B2 | 3/2010 | Makino et al. |
| 7,738,093 B2 | 6/2010 | Alles et al. |
| 7,739,064 B1 | 6/2010 | Ryker et al. |
| 7,752,584 B2 | 7/2010 | Yang |
| 7,760,929 B2 | 7/2010 | Orbon et al. |
| 7,877,722 B2 | 1/2011 | Duffy et al. |
| 7,890,917 B1 | 2/2011 | Young et al. |
| 7,904,845 B2 | 3/2011 | Fouquet et al. |
| 7,968,859 B2 | 6/2011 | Young et al. |
| 8,073,240 B2 | 12/2011 | Fischer et al. |
| 8,112,241 B2 | 2/2012 | Xiong |
| 8,126,255 B2 | 2/2012 | Bhaskar et al. |
| 2001/0017694 A1 | 8/2001 | Oomori et al. |
| 2001/0019625 A1 | 9/2001 | Kenan et al. |
| 2001/0022858 A1 | 9/2001 | Komiya et al. |
| 2001/0043735 A1 | 11/2001 | Smargiassi et al. |
| 2002/0010560 A1 | 1/2002 | Balachandran |
| 2002/0019729 A1 | 2/2002 | Chang et al. |
| 2002/0026626 A1 | 2/2002 | Randall et al. |
| 2002/0033449 A1 | 3/2002 | Nakasuji et al. |
| 2002/0035461 A1 | 3/2002 | Chang et al. |
| 2002/0035641 A1 | 3/2002 | Kurose et al. |
| 2002/0035717 A1 | 3/2002 | Matsuoka |
| 2002/0054291 A1 | 5/2002 | Tsai et al. |
| 2002/0088951 A1 | 7/2002 | Chen |
| 2002/0090746 A1 | 7/2002 | Xu et al. |
| 2002/0134936 A1 | 9/2002 | Matsui et al. |
| 2002/0144230 A1 | 10/2002 | Rittman |
| 2002/0145734 A1 | 10/2002 | Watkins et al. |
| 2002/0164065 A1 | 11/2002 | Cai et al. |
| 2002/0168099 A1 | 11/2002 | Noy |
| 2002/0176096 A1 | 11/2002 | Sentoku et al. |
| 2002/0181756 A1 | 12/2002 | Shibuya et al. |
| 2002/0186878 A1 | 12/2002 | Hoon et al. |
| 2002/0192578 A1 | 12/2002 | Tanaka et al. |
| 2003/0004699 A1 | 1/2003 | Choi et al. |
| 2003/0014146 A1 | 1/2003 | Fujii et al. |
| 2003/0017664 A1 | 1/2003 | Pnueli et al. |
| 2003/0022401 A1 | 1/2003 | Hamamatsu et al. |
| 2003/0033046 A1 | 2/2003 | Yoshitake et al. |
| 2003/0048458 A1 | 3/2003 | Mieher et al. |
| 2003/0048939 A1 | 3/2003 | Lehman |
| 2003/0057971 A1 | 3/2003 | Nishiyama et al. |
| 2003/0076989 A1 | 4/2003 | Maayah et al. |
| 2003/0086081 A1 | 5/2003 | Lehman |
| 2003/0094572 A1 | 5/2003 | Matsui et al. |
| 2003/0098805 A1 | 5/2003 | Bizjak et al. |
| 2003/0128870 A1 | 7/2003 | Pease et al. |
| 2003/0138138 A1 | 7/2003 | Vacca et al. |
| 2003/0138978 A1 | 7/2003 | Tanaka et al. |
| 2003/0169916 A1 | 9/2003 | Hayashi et al. |
| 2003/0173516 A1 | 9/2003 | Takane et al. |
| 2003/0192015 A1 | 10/2003 | Liu |
| 2003/0207475 A1 | 11/2003 | Nakasuji et al. |
| 2003/0223639 A1 | 12/2003 | Shlain et al. |
| 2003/0226951 A1 | 12/2003 | Ye et al. |
| 2003/0227620 A1 | 12/2003 | Yokoyama et al. |
| 2003/0228714 A1 | 12/2003 | Smith et al. |

(56) References Cited

U.S. PATENT DOCUMENTS

| | | |
|---|---|---|
| 2003/0229410 A1 | 12/2003 | Smith et al. |
| 2003/0229412 A1 | 12/2003 | White et al. |
| 2003/0229868 A1 | 12/2003 | White et al. |
| 2003/0229875 A1 | 12/2003 | Smith et al. |
| 2003/0229880 A1 | 12/2003 | White et al. |
| 2003/0229881 A1 | 12/2003 | White et al. |
| 2003/0237064 A1 | 12/2003 | White et al. |
| 2004/0030430 A1 | 2/2004 | Matsuoka |
| 2004/0032908 A1 | 2/2004 | Hagai et al. |
| 2004/0049722 A1 | 3/2004 | Matsushita |
| 2004/0052411 A1 | 3/2004 | Qian et al. |
| 2004/0057611 A1 | 3/2004 | Lee et al. |
| 2004/0066506 A1 | 4/2004 | Elichai et al. |
| 2004/0091142 A1 | 5/2004 | Peterson et al. |
| 2004/0094762 A1 | 5/2004 | Hess et al. |
| 2004/0098216 A1 | 5/2004 | Ye et al. |
| 2004/0102934 A1 | 5/2004 | Chang |
| 2004/0107412 A1 | 6/2004 | Pack et al. |
| 2004/0119036 A1 | 6/2004 | Ye et al. |
| 2004/0120569 A1 | 6/2004 | Hung et al. |
| 2004/0133369 A1 | 7/2004 | Pack et al. |
| 2004/0147121 A1 | 7/2004 | Nakagaki et al. |
| 2004/0174506 A1 | 9/2004 | Smith |
| 2004/0179738 A1 | 9/2004 | Dai et al. |
| 2004/0199885 A1 | 10/2004 | Lu et al. |
| 2004/0223639 A1 | 11/2004 | Sato et al. |
| 2004/0228515 A1 | 11/2004 | Okabe et al. |
| 2004/0234120 A1 | 11/2004 | Honda et al. |
| 2004/0243320 A1 | 12/2004 | Chang et al. |
| 2004/0246476 A1 | 12/2004 | Bevis et al. |
| 2004/0254752 A1 | 12/2004 | Wisniewski et al. |
| 2005/0004774 A1 | 1/2005 | Volk et al. |
| 2005/0008218 A1 | 1/2005 | O'Dell et al. |
| 2005/0010890 A1 | 1/2005 | Nehmadi et al. |
| 2005/0013474 A1 | 1/2005 | Sim |
| 2005/0062962 A1 | 3/2005 | Fairley et al. |
| 2005/0069217 A1 | 3/2005 | Mukherjee |
| 2005/0117796 A1 | 6/2005 | Matsui et al. |
| 2005/0132306 A1 | 6/2005 | Smith et al. |
| 2005/0141764 A1 | 6/2005 | Tohyama et al. |
| 2005/0166174 A1 | 7/2005 | Ye et al. |
| 2005/0184252 A1 | 8/2005 | Ogawa et al. |
| 2005/0190957 A1 | 9/2005 | Cai et al. |
| 2005/0198602 A1 | 9/2005 | Brankner et al. |
| 2006/0000964 A1 | 1/2006 | Ye et al. |
| 2006/0036979 A1 | 2/2006 | Zurbrick et al. |
| 2006/0038986 A1 | 2/2006 | Honda et al. |
| 2006/0048089 A1 | 3/2006 | Schwarzband |
| 2006/0051682 A1 | 3/2006 | Hess et al. |
| 2006/0062445 A1 | 3/2006 | Verma et al. |
| 2006/0066339 A1 | 3/2006 | Rajski et al. |
| 2006/0082763 A1 | 4/2006 | Teh et al. |
| 2006/0159333 A1 | 7/2006 | Ishikawa |
| 2006/0161452 A1 | 7/2006 | Hess |
| 2006/0193506 A1 | 8/2006 | Dorphan et al. |
| 2006/0193507 A1 | 8/2006 | Sali et al. |
| 2006/0236294 A1 | 10/2006 | Saidin et al. |
| 2006/0236297 A1 | 10/2006 | Melvin, III et al. |
| 2006/0239536 A1 | 10/2006 | Shibuya et al. |
| 2006/0265145 A1 | 11/2006 | Huet et al. |
| 2006/0266243 A1 | 11/2006 | Percin et al. |
| 2006/0269120 A1 | 11/2006 | Nehmadi et al. |
| 2006/0273242 A1 | 12/2006 | Hunsche et al. |
| 2006/0273266 A1 | 12/2006 | Preil et al. |
| 2006/0277520 A1 | 12/2006 | Gennari |
| 2006/0291714 A1 | 12/2006 | Wu et al. |
| 2006/0292463 A1 | 12/2006 | Best et al. |
| 2007/0002322 A1 | 1/2007 | Borodovsky et al. |
| 2007/0011628 A1 | 1/2007 | Ouali et al. |
| 2007/0013901 A1 | 1/2007 | Kim et al. |
| 2007/0019171 A1 | 1/2007 | Smith |
| 2007/0019856 A1 | 1/2007 | Furman et al. |
| 2007/0031745 A1 | 2/2007 | Ye et al. |
| 2007/0032896 A1 | 2/2007 | Ye et al. |
| 2007/0035322 A1 | 2/2007 | Kang et al. |
| 2007/0035712 A1 | 2/2007 | Gassner et al. |
| 2007/0035728 A1 | 2/2007 | Kekare et al. |
| 2007/0052963 A1 | 3/2007 | Orbon et al. |
| 2007/0064995 A1 | 3/2007 | Oaki et al. |
| 2007/0133860 A1 | 6/2007 | Lin et al. |
| 2007/0156379 A1 | 7/2007 | Kulkarni et al. |
| 2007/0230770 A1 | 10/2007 | Kulkarni et al. |
| 2007/0248257 A1 | 10/2007 | Bruce et al. |
| 2007/0280527 A1 | 12/2007 | Almogy et al. |
| 2007/0288219 A1 | 12/2007 | Zafar et al. |
| 2008/0013083 A1 | 1/2008 | Kirk et al. |
| 2008/0015802 A1 | 1/2008 | Urano et al. |
| 2008/0016481 A1 | 1/2008 | Matsuoka et al. |
| 2008/0049994 A1 | 2/2008 | Rognin et al. |
| 2008/0058977 A1 | 3/2008 | Honda |
| 2008/0072207 A1 | 3/2008 | Verma et al. |
| 2008/0081385 A1 | 4/2008 | Marella et al. |
| 2008/0163140 A1* | 7/2008 | Fouquet et al. .................. 716/4 |
| 2008/0167829 A1 | 7/2008 | Park et al. |
| 2008/0250384 A1 | 10/2008 | Duffy et al. |
| 2008/0295047 A1 | 11/2008 | Nehmadi et al. |
| 2008/0295048 A1 | 11/2008 | Nehmadi et al. |
| 2008/0304056 A1 | 12/2008 | Alles et al. |
| 2009/0024967 A1 | 1/2009 | Su et al. |
| 2009/0037134 A1 | 2/2009 | Kulkarni et al. |
| 2009/0041332 A1 | 2/2009 | Bhaskar et al. |
| 2009/0043527 A1 | 2/2009 | Park et al. |
| 2009/0055783 A1 | 2/2009 | Florence et al. |
| 2009/0067703 A1 | 3/2009 | Lin et al. |
| 2009/0080759 A1 | 3/2009 | Bhaskar et al. |
| 2009/0210183 A1 | 8/2009 | Rajski et al. |
| 2009/0257645 A1 | 10/2009 | Chen et al. |
| 2009/0284733 A1 | 11/2009 | Wallingford et al. |
| 2009/0290782 A1 | 11/2009 | Regensburger |
| 2009/0323052 A1 | 12/2009 | Silberstein et al. |
| 2010/0119144 A1* | 5/2010 | Kulkarni et al. .............. 382/149 |
| 2010/0142800 A1 | 6/2010 | Pak et al. |
| 2010/0146338 A1 | 6/2010 | Schalick et al. |
| 2010/0150429 A1 | 6/2010 | Jau et al. |
| 2010/0226562 A1 | 9/2010 | Wu et al. |
| 2011/0013825 A1 | 1/2011 | Shibuya et al. |
| 2011/0052040 A1 | 3/2011 | Kuan |
| 2011/0129142 A1* | 6/2011 | Takahashi et al. ............ 382/149 |
| 2011/0184662 A1 | 7/2011 | Badger et al. |
| 2011/0251713 A1 | 10/2011 | Teshima et al. |
| 2011/0276935 A1 | 11/2011 | Fouquet et al. |
| 2011/0311126 A1 | 12/2011 | Sakai et al. |
| 2012/0308112 A1 | 12/2012 | Hu et al. |
| 2012/0319246 A1 | 12/2012 | Tan et al. |
| 2013/0009989 A1 | 1/2013 | Chen et al. |
| 2013/0027196 A1 | 1/2013 | Yankun et al. |
| 2013/0336575 A1 | 12/2013 | Dalla-Torre et al. |

FOREIGN PATENT DOCUMENTS

| | | |
|---|---|---|
| CN | 1646896 | 7/2005 |
| EP | 0032197 | 7/1981 |
| EP | 0370322 | 5/1990 |
| EP | 1061358 | 12/2000 |
| EP | 1061571 | 12/2000 |
| EP | 1065567 | 1/2001 |
| EP | 1066925 | 1/2001 |
| EP | 1069609 | 1/2001 |
| EP | 1093017 | 4/2001 |
| EP | 1329771 | 7/2003 |
| EP | 1480034 | 11/2004 |
| EP | 1696270 | 8/2006 |
| JP | 7-159337 | 6/1995 |
| JP | 2002071575 | 3/2002 |
| JP | 2002-365235 | 12/2002 |
| JP | 2003-215060 | 7/2003 |
| JP | 2004-045066 | 2/2004 |
| JP | 2005-283326 | 10/2005 |
| JP | 2007-234798 | 9/2007 |
| JP | 2009-122046 | 6/2009 |
| JP | 2010-256242 | 11/2010 |
| JP | 2012-225768 | 11/2012 |
| KR | 10-2001-0007394 | 1/2001 |
| KR | 10-2001-0037026 | 5/2001 |

(56) References Cited

FOREIGN PATENT DOCUMENTS

| | | |
|---|---|---|
| KR | 10-2001-0101697 | 11/2001 |
| KR | 1020030055848 | 7/2003 |
| KR | 10-2005-0092053 | 9/2005 |
| KR | 10-2006-0075691 | 7/2006 |
| KR | 10-2006-0124514 | 12/2006 |
| KR | 10-0696276 | 3/2007 |
| KR | 10-2010-0061018 | 6/2010 |
| KR | 10-2012-0068128 | 6/2012 |
| WO | 9857358 | 12/1998 |
| WO | 9922310 | 5/1999 |
| WO | 9925004 | 5/1999 |
| WO | 9959200 | 5/1999 |
| WO | 9938002 | 7/1999 |
| WO | 9941434 | 8/1999 |
| WO | 0003234 | 1/2000 |
| WO | 0036525 | 6/2000 |
| WO | 0055799 | 9/2000 |
| WO | 0068884 | 11/2000 |
| WO | 0070332 | 11/2000 |
| WO | 0109566 | 2/2001 |
| WO | 0140145 | 6/2001 |
| WO | 03104921 | 12/2003 |
| WO | 2004027684 | 4/2004 |
| WO | 2006/012388 | 2/2006 |
| WO | 2006063268 | 6/2006 |
| WO | 2009/152046 | 9/2009 |
| WO | 2010/093733 | 8/2010 |

OTHER PUBLICATIONS

Cai et al., "Enhanced Dispositioning of Reticle Defects Using the Virtual Stepper With Automated Defect Severity Scoring," Proceedings of the SPIE, vol. 4409, Jan. 2001, pp. 467-478.
Comizzoli, "Uses of Corona Discharges in the Semiconductor Industry," J. Electrochem. Soc., 1987, pp. 424-429.
Contactless Electrical Equivalent Oxide Thickness Measurement, IBM Technical Disclosure Bulletin, vol. 29, No. 10, 1987, pp. 4622-4623.
Contactless Photovoltage vs. Bias Method for Determining Flat-Band Voltage, IBM Technical Disclosure Bulletin, vol. 32, vol. 9A, 1990, pp. 14-17.
Cosway et al., "Manufacturing Implementation of Corona Oxide Silicon (COS) Systems for Diffusion Furnace Contamination Monitoring," 1997 IEEE/SEMI Advanced Semiconductor Manufacturing Conference, pp. 98-102.
Diebold et al., "Characterization and production metrology of thin transistor gate oxide films," Materials Science in Semiconductor Processing 2, 1999, pp. 103-147.
Dirksen et al., "Impact of high order aberrations on the performance of the aberration monitor," Proc. of SPIE vol. 4000, Mar. 2000, pp. 9-17.
Dirksen et al., "Novel aberration monitor for optical lithography," Proc. of SPIE vol. 3679, Jul. 1999, pp. 77-86.
Garcia et al., "New Die to Database Inspection Algorithm for Inspection of 90-nm Node Reticles," Proceedings of SPIE, vol. 5130, 2003, pp. 364-374.
Granik et al., "Sub-resolution process windows and yield estimation technique based on detailed full-chip CD simulation," Mentor Graphics, Sep. 2000, 5 pages.
Hess et al., "A Novel Approach: High Resolution Inspection with Wafer Plane Defect Detection," Proceedings of SPIE—International Society for Optical Engineering; Photomask and Next-Generation Lithography Mask Technology 2008, vol. 7028, 2008.
Huang et al., "Process Window Impact of Progressive Mask Defects, Its Inspection and Disposition Techniques (go/no-go criteria) via a Lithographic Detector," Proceedings of SPIE—The International Society for Optical Engineering; 25th Annual Bacus Symposium on Photomask Technology 2005, vol. 5992, No. 1, 2005, p. 6.
Hung et al., Metrology Study of Sub 20 Angstrom oxynitride by Corona-Oxide-Silicon (COS) and Conventional C-V Approaches, 2002, Mat. Res. Soc. Symp. Proc., vol. 716, pp. 119-124.

International Search Report for PCT/US2003/021907 mailed Jun. 7, 2004.
International Search Report for PCT/US2004/040733 mailed Dec. 23, 2005.
International Search Report for PCT/US2006/061112 mailed Sep. 25, 2008.
International Search Report for PCT/US2006/061113 mailed Jul. 16, 2008.
International Search Report for PCT/US2008/050397 mailed Jul. 11, 2008.
International Search Report for PCT/US2008/062873 mailed Aug. 12, 2008.
International Search Report for PCT/US2008/062875 mailed Sep. 10, 2008.
International Search Report for PCT/US2008/063008 mailed Aug. 18, 2008.
International Search Report for PCT/US2008/066328 mailed Oct. 1, 2009.
International Search Report for PCT/US2008/070647 mailed Dec. 16, 2008.
International Search Report for PCT/US2008/072636 mailed Jan. 29, 2009.
International Search Report for PCT/US2008/073706 mailed Jan. 29, 2009.
Karklin et al., "Automatic Defect Severity Scoring for 193 nm Reticle Defect Inspection," Proceedings of SPIE—The International Society for Optical Engineering, 2001, vol. 4346, No. 2, pp. 898-906.
Lo et al., "Identifying Process Window Marginalities of Reticle Designs for 0.15/0.13 μm Technologies," Proceedings of SPIE vol. 5130, 2003, pp. 829-837.
Lorusso et al. "Advanced DFM Applns. Using design-based metrology on CDSEM," SPIE vol. 6152, Mar. 27, 2006.
Lu et al., "Application of Simulation Based Defect Printability Analysis for Mask Qualification Control," Proceedings of SPIE, vol. 5038, 2003, pp. 33-40.
Mack, "Lithographic Simulation: A Review," Proceedings of SPIE vol. 4440, 2001, pp. 59-72.
Martino et al., "Application of the Aerial Image Measurement System (AIMS(TM)) to the Analysis of Binary Mask Imaging and Resolution Enhancement Techniques," SPIE vol. 2197, 1994, pp. 573-584.
Miller, "A New Approach for Measuring Oxide Thickness," Semiconductor International, Jul. 1995, pp. 147-148.
Nagpal et al., "Wafer Plane Inspection for Advanced Reticle Defects," Proceedings of SPIE—The International Society for Optical Engineering; Photomask and Next-Generation Lithography Mask Technology. vol. 7028, 2008.
Numerical Recipes in C. the Art of Scientific Computing, 2nd Ed., © Cambridge University Press 1988, 1992, p. 683.
O'Gorman et al., "Subpixel Registration Using a Concentric Ring Fiducial," Proceedings of the International Conference on Pattern Recognition, vol. ii, Jun. 16, 1990, pp. 249-253.
Otsu, "A Threshold Selection Method from Gray-Level Histograms," IEEE Transactions on Systems, Man, and Cybernetics, vol. SMC-9, No. 1, Jan. 1979, pp. 62-66.
Pang et al., "Simulation-based Defect Printability Analysis on Alternating Phase Shifting Masks for 193 nm Lithography," Proceedings of SPIE, vol. 4889, 2002, pp. 947-954.
Pettibone et al., "Wafer Printability Simulation Accuracy Based on UV Optical Inspection Images of Reticle Defects," Proceedings of SPIE—The International Society for Optical Engineering 1999 Society of Photo-Optical Instrumentation Engineers, vol. 3677, No. II, 1999, pp. 711-720.
Huang et al., "Using Design Based Binning to Improve Defect Excursion Control for 45nm Production," IEEE, International Symposium on Semiconductor Manufacturing, Oct. 2007, pp. 1-3.
Phan et al., "Comparison of Binary Mask Defect Printability Analysis Using Virtual Stepper System and Aerial Image Microscope System," Proceedings of SPIE—The International Society for Optical Engineering 1999 Society of Photo-Optical Instrumentation Engineers, vol. 3873, 1999, pp. 681-692.
Sahouria et al., "Full-chip Process Simulation for Silicon DRC," Mentor Graphics, Mar. 2000, 6 pages.

(56) References Cited

OTHER PUBLICATIONS

Sato et al., "Defect Criticality Index (DCI): A new methodology to significantly improve DOI sampling rate in a 45nm production environment," Metrology, Inspection, and Process Control for Microlithography XXII, Proc. of SPIE vol. 6922, 692213 (2008), pp. 1-9.
Schroder et al., Corona-Oxide-Semiconductor Device Characterization, 1998, Solid-State Electronics, vol. 42, No. 4, pp. 505-512.
Schroder, "Surface voltage and surface photovoltage: history, theory and applications," Measurement Science and Technology, vol. 12, 2001, pp. R16-R31.
Schroder, Contactless Surface Charge Semiconductor Characterization, Apr. 2002, Materials Science and Engineering B, vol. 91-92, pp. 196-228.
Schurz et al., "Simulation Study of Reticle Enhancement Technology Applications for 157 nm Lithography," SPIE vol. 4562, 2002, pp. 902-913.
Svidenko et al. "Dynamic Defect-Limited Yield Prediction by Criticality Factor," ISSM Paper: YE-O-157, 2007.
Tang et al., "Analyzing Volume Diagnosis Results with Statistical Learning for Yield Improvement" 12th IEEE European Test Symposium, Freiburg 2007, IEEE European, May 20-24, 2007, pp. 145-150.
Verkuil et al., "A Contactless Alternative to MOS Charge Measurements by Means of a Corona-Oxide-Semiconductor (COS) Technique," Electrochem. Soc. Extended Abstracts, 1988, vol. 88-1, No. 169, pp. 261-262.
Verkuil, "Rapid Contactless Method for Measuring Fixed Oxide Charge Associated with Silicon Processing," IBM Technical Disclosure Bulletin, vol. 24, No. 6, 1981, pp. 3048-3053.
Volk et al. "Investigation of Reticle Defect Formation at DUV Lithography," 2002, BACUS Symposium on Photomask Technology.
Volk et al. "Investigation of Reticle Defect Formation at DUV Lithography," 2003, IEEE/SEMI Advanced Manufacturing Conference, pp. 29-35.
Volk et al., "Investigation of Smart Inspection of Critical Layer Reticles using Additional Designer Data to Determine Defect Significance," Proceedings of SPIE vol. 5256, 2003, pp. 489-499.
Weinberg, "Tunneling of Electrons from Si into Thermally Grown $SiO_2$," Solid-State Electronics, 1977, vol. 20, pp. 11-18.
Weinzierl et al., "Non-Contact Corona-Based Process Control Measurements: Where We've Been, Where We're Headed," Electrochemical Society Proceedings, Oct. 1999, vol. 99-16, pp. 342-350.
Yan et al., "Printability of Pellicle Defects in DUV 0.5 um Lithography," SPIE vol. 1604, 1991, pp. 106-117.
International Search Report and Written Opinion for PCT/US2012/054904 mailed Mar. 26, 2013.
U.S. Appl. No. 60/681,095, filed May 13, 2005 by Nehmadi et al.
U.S. Appl. No. 60/684,360, filed May 24, 2005 by Nehmadi et al.
U.S. Appl. No. 10/778,752, filed Feb. 13, 2004 by Preil et al.
U.S. Appl. No. 10/793,599, filed Mar. 4, 2004 by Howard et al.
U.S. Appl. No. 11/139,151, filed Feb. 10, 2005 by Volk.
U.S. Appl. No. 11/154,310, filed Feb. 10, 2005 by Verma et al.
U.S. Appl. No. 12/394,752, filed Feb. 27, 2009 by Xiong et al.
U.S. Appl. No. 12/403,905, filed Mar. 13, 2009 by Xiong.
Allan et al., "Critical Area Extraction for Soft Fault Estimation," IEEE Transactions on Semiconductor Manufacturing, vol. 11, No. 1, Feb. 1998.
Barty et al., "Aerial Image Microscopes for the inspection of defects in EUV masks," Proceedings of SPIE, vol. 4889, 2002, pp. 1073-1084.
U.S. Appl. No. 13/652,377, filed Oct. 15, 2012 by Wu et al.
Guo et al., "License Plate Localization and Character Segmentation with Feedback Self-Learning and Hybrid Binarization Techniques," IEEE Transactions on Vehicular Technology, vol. 57, No. 3, May 2008, pp. 1417-1424.
Liu, "Robust Image Segmentation Using Local Median," Proceedings of the 3rd Canadian Conference on Computer and Robot Vision (CRV'06) 0-7695-2542-3/06, 2006 IEEE, 7 pages total.

\* cited by examiner

DETERMINING DESIGN COORDINATES FOR WAFER DEFECTS

CROSS-REFERENCE TO RELATED APPLICATIONS

This application claims priority to U.S. Provisional Application No. 61/534,104 entitled "1-Pixel Defect Location Accuracy (DLA) Through SEM Image Based Analysis and Cross Platform Integration," filed Sep. 13, 2011, which is incorporated by reference as if fully set forth herein.

BACKGROUND OF THE INVENTION

1. Field of the Invention

This invention generally relates to methods and systems for determining design coordinates for defects detected on a wafer.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Accurately determining the location of a defect on a wafer is important for a number of reasons. In currently used approaches, defect location accuracy is limited due to inspection tool capability such as stage accuracy and run-time alignment. Relative to locations in design, a wafer coordinate system can be manually aligned to a design coordinate system by compensating for differences in offset, scale, and rotation. However, this approach does not address the errors coming from swath-related location errors. As a result, defect location accuracy (DLA) is limited to several times the inspection pixel being used even on advanced inspection tools.

The manual method described above has many disadvantages. For example, DLA is only improved by manually aligning the wafer coordinate system to the design coordinate system. The correction is typically limited to two sites for the whole wafer and therefore it lacks consideration for swath-based error. DLA error includes both inspection tool error and design-to-wafer alignment error, thereby limiting the DLA error to several multiples of inspection pixel size.

Accordingly, it would be advantageous to develop systems and/or methods that do not have one or more of the disadvantages described above.

SUMMARY OF THE INVENTION

The following description of various embodiments is not to be construed in any way as limiting the subject matter of the appended claims.

One embodiment relates to a computer-implemented method for determining design coordinates for defects detected on a wafer. The method includes aligning a design for a wafer to images generated by a defect review tool for defects detected in multiple swaths by an inspection tool. The defects include two or more defects detected in each of the multiple swaths. In other words, in this method, two or more defects from each of the multiple swaths are aligned to the design. The method also includes determining a position of each of the defects in design coordinates based on results of the aligning step. In addition, the method includes separately determining a defect position offset for each of the multiple swaths based on the swath in which each of the defects was detected (defects that were detected and aligned from that swath), the design coordinates for each of the defects, and a position for each of the defects as determined by the inspection tool (the original wafer position). This produces a correction factor for each swatch. The method further includes determining design coordinates for other defects detected in the multiple swaths by the inspection tool by applying one of the defect position offsets to positions of the other defects determined by the inspection tool depending on the swath in which the other defects were detected (applying the appropriate swatch correction factor to the defect). The aligning step, determining the position, separately determining the swath-relative defect position offsets, and determining the design coordinates are performed by a computer system.

The method described above may be performed as described further herein. In addition, the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for determining design coordinates for defects detected on a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to determine design coordinates for defects detected on a wafer. The system includes a defect review tool configured to generate images for defects detected in multiple swaths scanned on a wafer by an inspection tool. The imaged defects include two or more defects detected in each of the multiple swaths. The system also includes a computer system configured to perform the steps of the method described above. The system may be further configured as described herein.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

One embodiment relates to a computer-implemented method for determining design coordinates for defects detected on a wafer. The embodiments described herein integrate several scattered technologies to improve defect locations after inspection. For example, the method includes aligning a design for a wafer to images generated by a defect review tool for defects detected in multiple swaths scanned on the wafer by an inspection tool. Therefore, the embodiments described herein effectively integrate inspection, defect review, and design technologies.

The method may or may not include running a defect inspection. For example, the method may include inspecting the wafer by scanning multiple swaths on the wafer using the inspection tool. Alternatively, information for the defects detected in the multiple swaths may be acquired for use in the methods described herein from a computer-readable storage medium in which the information has been stored by the inspection tool. In either case, the results of the wafer inspection may include an inspection results file. The inspection results file may be sent to the defect review tool so that the defect review tool may perform one or more steps described herein using information about the defects in the inspection results file. In a similar manner, the method may or may not include generating the images using the defect review tool. For example, the method may include imaging the detects on the wafer using the defect review tool. Alternatively, images generated by the defect review tool for the defects may be acquired for use in the methods described herein from a computer-readable storage medium in which the images have been stored by the defect review tool. The multiple swaths may include all or each of the swaths scanned on the wafer. In this manner, the method may include inspection swath-based alignment to improve defect location accuracy (DLA) for each swath.

In one embodiment, the design is provided in a Graphical Data System (GDS) or Open Artwork System Interchange Standard (OASIS) file. In another embodiment, the method includes acquiring the design from an electronic design automation (EDA) tool. In this manner, the method may include using defect review tool images and design layout for accurate alignment. The design or information for the design used in the embodiments described herein may include any other design data known in the art.

In one embodiment, the defect review tool is a scanning electron microscope (SEM). The SEM may include any suitable commercially available SEM defect review tool known in the art such as the eDR7000, which is commercially available from KLA-Tencor, Milpitas, Calif. In this manner, aligning the design to images generated by the defect review tool may include aligning SEM images to the design. Using SEM image-to-design alignment mitigates any inspection tool noise impact on the results produced by the embodiments described herein.

In another embodiment, the inspection tool is an optical (i.e., light-based) inspection tool. In some embodiments, the inspection tool is an electron beam-based inspection tool. The inspection tool may include any suitable commercially available light- or electron beam-based inspection tool known in the art. In addition, the light-based inspection tool may be a bright field (BF) and/or dark field (DF) inspection tool. In this manner, the inspection tool used in the embodiments described herein is not limited to BF, DF, and/or electron beam inspection. In other words, the embodiments described herein are independent of the inspection tool platform.

Figure 1:
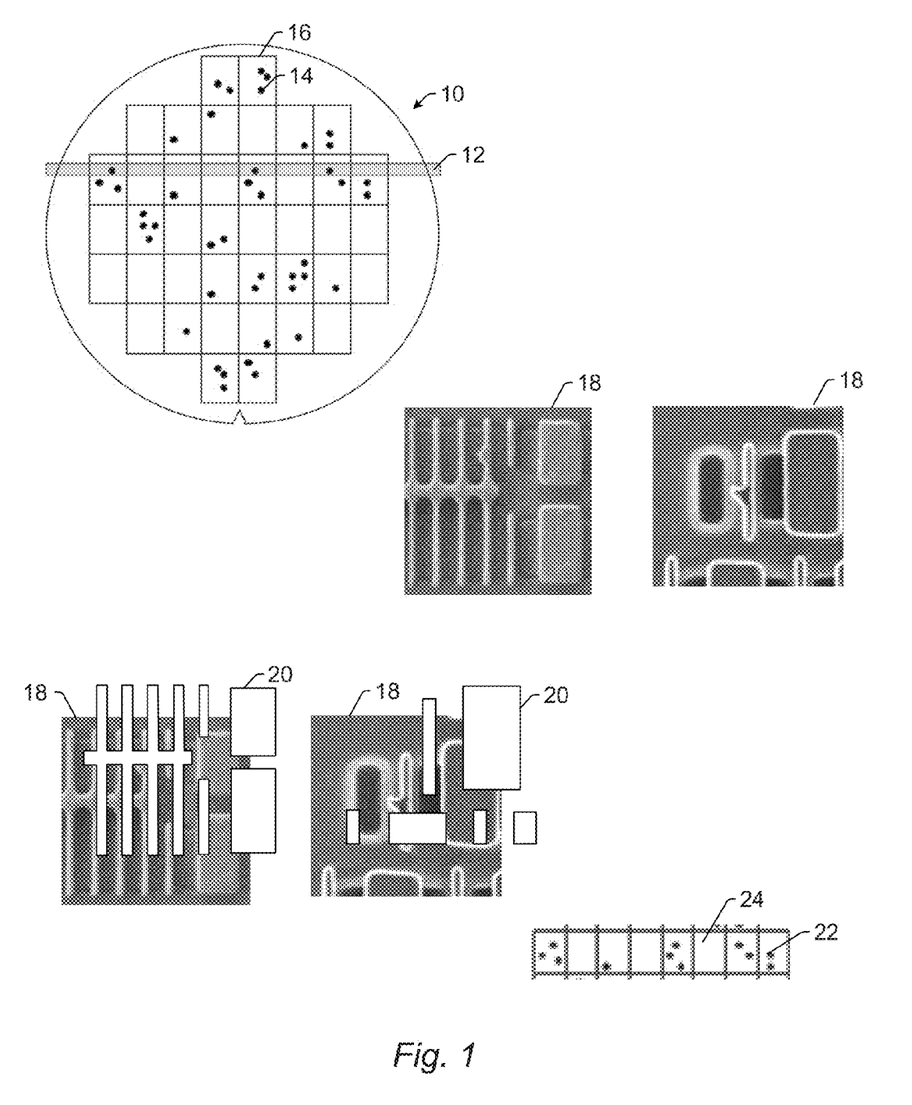
FIG. 1 is a schematic diagram illustrating one embodiment of a method for determining design coordinates for defects detected on a wafer.

The defects include two or more defects detected in each of the multiple swaths. For example, the method may include using two defects per swath to align to design images. In one embodiment, the method includes sampling the defects for which the images are generated by the defect review tool based on the swath in which the defects are detected. For example, sampling the defects may include selecting a relatively small number of defects from each swath in an inspection tot result using swath information that is saved in the inspection results file. In this manner, the method may include inspection swath-based sampling to improve DLA for each swath. The two or more defects also preferably include fewer than all of the defects detected in each of the multiple swaths. The number of defects for which defect review tool images are generated in the embodiments described herein may vary depending on the speed of the defect review tool. For example, with faster defect review tool image generation, the same concept can be extended to include additional defects for even better accuracy and robustness.

in one such embodiment, as shown in FIG. 1, wafer map 10 shows results of an inspection in which multiple swaths 12 were scanned on a wafer by an inspection tool (not shown in FIG. 1), which detected defects 14 on the wafer. The wafer map also shows the locations of dies 16 on the wafer. Only one of the multiple swaths 12 is shown in FIG. 1 for simplicity. In this example, sampling the defects as described above may include sampling two defects per swath from the inspection results file post inspection. More specifically, two defects may be sampled from the swath shown in FIG. 1, then two other defects may be sampled from another of the multiple swaths, and so on. After the defects have been sampled from the swaths on a swath-by-swath basis, images 18 may be generated for the sampled defects using the defect review tool (not shown in FIG. 1) or may be acquired from a computer-readable storage medium in which the images have been stored by the defect review tool. As shown in FIG. 1, images 18 may be relatively high resolution SEM images. The images may be generated by the defect review tool at the locations of the defects as determined by the inspection tool (e.g., at defect locations Xi, Yi). The aligning step may then include aligning images 18 to portions 20 of the design. The portions of the design may be called design "clips" or GDS clips.

In some embodiments, the method includes locating the defects in the images using automatic defect locating (ADL) performed by the defect review tool. For example, once the defects are imaged on the defect review tool, the defects may be located in the images by ADL. ADL may be performed in any suitable manner known in the art.

In one embodiment, the aligning includes image processing. In some embodiments, the image processing may include optimizing SEM images for best edge detection for each layer on the wafer. Such training may be automated. In another embodiment, the aligning step includes overlaying portions of the design with the images. In this manner, the aligning step may include overlaying SEM images with a design layout.

For example, as shown in FIG. 1, images 18 may be overlaid with portions 20 of the design, and then the positions of images 18 relative to portions 20 of the design may be altered until features in the images substantially match features in the portions of the design.

The method also includes determining a position of each of the defects in design coordinates based on results of the aligning step. In this manner, the method includes determining defect design coordinates. For example, the defect location determined by ADL in the defect review tool-generated images may be assigned the design coordinates of the corresponding location in the design that overlays the detect after alignment. In this manner, the method may include determining substantially precise locations of the defects in design space with SEM location accuracy.

The method also includes separately determining a defect position offset for each of the multiple swaths (i.e. swatch correction factor) based on the swath in which each of the defects was detected, the design coordinates for each of the defects, and a position for each of the defects determined by the inspection tool. In this manner, the method may include determining a location correction for each of the multiple swaths. For example, the location correction for each of the multiple swaths may be determined based on the alignment to design coordinates.

The method further includes determining design coordinates for other defects detected in the multiple swaths by the inspection tool by applying one of the defect position offsets to positions of the other defects determined by the inspection tool depending on the swath in which the other defects were detected (i.e., applying the appropriate swath correction factor to each of the other defects detected from that swath). In this manner, the method includes applying the offsets to wafer inspection coordinates on a swath-by-swath basis to determine adjusted defect locations (e.g., corrected locations (Xf, Yf)). For example, as described above, two defects may be used to generate a location correction that may then be applied to all other defects in the multiple swaths on a swath-by-swath basis. In addition, the method includes image-based precision DLA. As such, a defect coordinate adjustment may be made from a SEM image to design file alignment. For example, the location corrections for each of the multiple swaths may be applied to all defects in the swaths on a swath-by-swath basis. In this manner, defect locations can be adjusted to improve the accuracy of the defect positions relative to the design.

The corrected defect locations may be sent to an inspection results file. For example, the results may be sent back to the inspection results file for further analysis. The corrected locations (Xf, Yf) can be used to enable new applications as well as to improve context based inspection (CBI) operation. CBI may be performed as described in U.S. Pat. No. 7,676,077 to Kulkarni et al., which is incorporated by reference as if fully set forth herein.

Aligning the design, determining the position, separately determining the defect position offset, and determining the design coordinates are performed by a computer system, which may be configured as described further herein.

In one embodiment, the defects and the other defects include all defects detected on the wafer. In other words, the defects used to determine the swath correction factor and the defects to which the appropriate swath correction factor is applied may include all defects on the wafer. In this manner, the design coordinates can be determined for all defects detected on the wafer. For example, as shown in FIG. 1, corrected locations (Xf, Xy) may be determined for all defects 22 in dies 24 on a wafer in addition to all other defects in all other dies on the wafer.

In some embodiments, aligning the design, determining the position, separately determining the defect position offset, and determining the design coordinates produce design coordinates for the other defects that are accurate to within one pixel of the inspection tool. For example, the embodiments described herein provide 1-pixel DIA through SEM image-based analysis and cross-platform integration. In particular, the embodiments provide +/−1 inspection pixel coordinate accuracy for all defects in a wafer inspection result by sampling a relatively small subset of the defects on a SEM review tool. In this manner, the embodiments described herein overcome the multiple pixels accuracy limitation of inspection tools by aligning to design and revising defect position within defect review tool location accuracy (e.g., ADL accuracy) for the sampled defects. Such improvements enable new applications that would further the use of inspection and review tools. In addition, the defect locations from inspection can be improved as described herein without further improvement in the inspection tool performance. No other technology currently available can achieve this coordinate accuracy.

In another embodiment, aligning the design, determining the position, separately determining the defect position offset, and determining the design coordinates produce design coordinates for the other defects with an accuracy approximately equal to the accuracy of the defect review tool for determining the location of the defects within the images. For example, the defect locations from inspection can be altered as described herein to achieve DLA coordinate accuracy within the margin of the defect review tool location error (e.g., within about 6 nm for the eDR7000 system). In particular, the stage jitter for each swath is about one half of a pixel. Advanced Bright-Field tool today may be about 10 nm. Therefore, the embodiments described herein may provide about 6 nm accuracy for sampled defects and about 10 nm for other defects. No other technology currently available can achieve this level of coordinate accuracy.

The embodiments described herein may also include using defect review tool and design based alignment to feedback into an inspection results file for new use case development. For example, in one embodiment, the method includes selecting a bitmap pixel (aka defective pixel) in inspection results produced by the inspection tool for the wafer based on the design coordinates determined for one of the defects or the other defects and altering a process used to inspect the wafer based on the selected (defective) pixel. In this manner, the method may include the use of improved DLA to identify a single pixel that is impacted by a defect for inspection optimization. Such embodiments may be used for inspection sensitivity optimization for certain defects. For example, the method may result in the detection of previously undetected "gap" defects on the wafer. In addition, the method may include adjusting the offset for each defect using the defect review tool images. The method may also include applying corrected defect coordinates to determine the bitmap or defective pixel on which to base the inspection optimization.

In addition, the embodiments may include performing sub-pixel analysis to understand defect-to-defect behavior based on different defect types. The embodiments described herein may also be used for setting up CBI, some examples of which are described in the above-referenced patent to Kulkarni. For example, the methods described herein may include performing a hot scan on the wafer to detect more defects on the wafer. The design coordinates determined for the defects as described herein may then be used to identify hot spots in the design. For example, the design coordinates of defects that are the same as or near critical features in the design may be identified as hot spots in the design. Based on the identified hot spots, a CBI process can be set up for other wafers on which the design will be printed. For example, the CBI process can be set up such that the hot spots are inspected with higher sensitivity than non-hot spots on the wafer.

There are also a number of other potential applications of the approaches described herein possibly with further improvements in inspection. For example, the results of the methods described herein may be used for inline bitmapping (for DRAM, FLASH, and SRAM) to localize the defect to a particular memory cell. The results of the methods may also be used for sampling based on schematic overlay with defect (e.g., if a defect overlaps with a metal interconnect specified in the design, that defect may be sampled). In addition, the results of the methods described herein may be used for binning defects by single via or double via, for N/P transistor separation, for yield prediction for future layers (e.g., particle on contact), and for binning defects by short or broken line or on or in between lines.

The embodiments described herein have a number of advantages over currently used methods for determining defect locations. For example, previously used approaches apply a wafer level offset for design-to-wafer alignment. Using the previous approach, DLA is limited to manually aligning to design and inspection system error. In addition, an alternative approach would be to align relatively high resolution optical patch images of the defects generated by the inspection tool during inspection of the wafer to a design layout for real-time alignment. However, this approach requires reliable patch images and also requires a new image matching algorithm. In contrast, defect review tool images such as SEM images generally have much better pattern fidelity compared to optical images. As such, by aligning the defect review tool images to design using image processing, accurate alignment of defect-to-design can be achieved and therefore overall DLA is improved.

Each of the embodiments of the method described above may include any other step(s) of any other method(s) described herein. Furthermore, each of the embodiments of the method described above may be performed by any of the systems described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Figure 2:
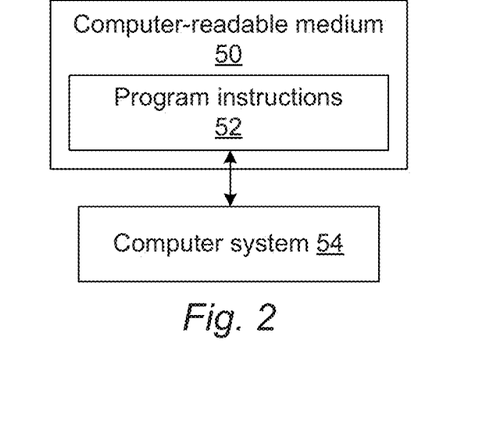
FIG. 2 is a block diagram illustrating one embodiment of a non-transitory computer-readable medium that includes program instructions executable on a computer system for performing one or more of the computer-implemented methods described herein.

An additional embodiment relates to a non-transitory computer-readable medium storing program instructions executable on a computer system for performing a computer-implemented method for determining design coordinates for defects detected on a wafer. One such embodiment is shown in FIG. 2. In particular, as shown in FIG. 2, computer-readable medium 50 includes program instructions 52 executable on computer system 54. The computer-implemented method includes the steps of the method described above. The computer-implemented method for which the program instructions are executable may include any other step(s) described herein.

Program instructions 52 implementing methods such as those described herein may be stored on computer-readable medium 50. The computer-readable medium may be a storage medium such as a magnetic or optical disk, or a magnetic tape or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing and software, either as a standalone or a networked tool.

Figure 3:
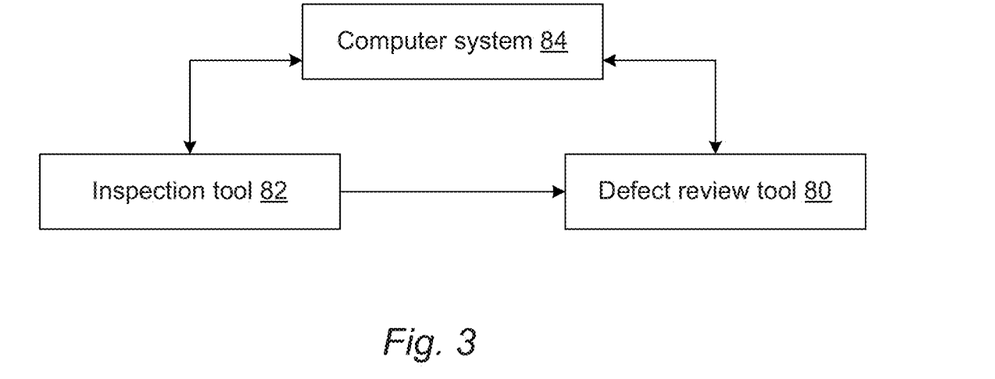
FIG. 3 is a schematic diagram illustrating a side view of one embodiment of a system configured to determine design coordinates for defects detected on a wafer.

An additional embodiment relates to a system configured to determine design coordinates for defects detected on a wafer. One embodiment of such a system is shown in FIG. 3. The system includes defect review tool 80 configured to generate images for defects detected in multiple swaths scanned on a wafer by inspection tool 82. The defects include two or more defects detected in each of the multiple swaths, Defect review tool 80 and inspection tool 82 may be further configured as described herein. As shown in FIG. 3, the defect review toot and the inspection tool may be coupled in some manner such that the inspection toot can send information about the defects to the defect review tool. For example, the inspection tool and the defect review tool may be coupled by a transmission medium (not shown), which may include wired and/or wireless portions, across which the inspection tool can send information to the defect review tool. Alternatively, the inspection tool may be effectively coupled to the defect review tool by a computer-readable storage medium (not shown in FIG. 3) such as a fab database in which the inspection tool can store information for the defects and from which the defect review tool can retrieve the defect information.

The system also includes computer system 84 configured for aligning a design for the wafer to the images, which may be performed as described herein. The computer system is also configured for determining a position of each of the defects in design coordinates based on results of the aligning step, which may be performed as described further herein. In addition, the computer system is configured for separately determining a defect position offset for each of the multiple swaths based on the swath in which each of the defects was detected, the design coordinates for each of the defects, and a position for each of the defects determined by the inspection tool, which may be performed as described herein. The computer system is further configured for determining design coordinates for other defects detected in the multiple swaths by the inspection tool by applying one of the defect position offsets to positions of the other defects determined by the inspection tool depending on the swath in which the other defects were detected (applying the appropriate swath correction factor to those defects), which may be performed as described further herein.

The computer system may be coupled to the defect review toot and the inspection tool in a manner such as that described above such that the computer system can send and receive information to and from the defect review tool and the inspection tool. The computer system may also be coupled to other tools in a similar manner such as an EDA tool from which the design may be acquired by the computer system for use in the embodiments described herein. The computer system and the system may be configured to perform any other step(s) described herein and may be further configured as described herein.

Further modifications and alternative embodiments of various aspects of the invention will be apparent to those skilled in the art in view of this description. For example, methods and systems for determining design coordinates for defects detected on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed:

1. A computer-implemented method for determining design coordinates for defects detected on a wafer, comprising:
    aligning a design for a wafer to images generated by a defect review tool at locations of defects on the wafer, wherein the defects are detected in multiple swaths scanned on the wafer by a wafer inspection tool prior to said aligning and prior to generation of the images by the defect review tool, wherein the locations of the defects at which the defect review tool generates the images are determined by the wafer inspection tool, wherein the defects comprises two or more first defects detected in a first of the multiple swaths and two or more second defects detected in a second of the multiple swaths, and wherein said aligning comprises overlaying portions of the design with the images generated by the defect review tool at the locations of the defects on the wafer;
    determining a position of each of the defects in design coordinates based on results of said aligning;
    separately determining at least a first defect position offset for the first of the multiple swaths, based on the design coordinates for each of the first defects and a position for each of the first defects determined by the wafer inspection tool, and a second defect position offset for the second of the multiple swaths, based on the design coordinates for each of the second defects and a position for each of the second defects determined by wafer inspection tool; and
    determining design coordinates for other defects detected in the multiple swaths by the wafer inspection tool by applying the first defect position offset to positions of the other defects determined by the wafer inspection tool that were detected in the first of the multiple swaths and applying the second defect position offset to positions of the other defects determined by the wafer inspection tool that were detected in the second of the multiple swaths, wherein said aligning, determining the position, separately determining at least the first and second defect position offsets, and determining the design coordinates are performed by a computer system.

2. The method of claim 1, wherein the defects and the other defects comprise all defects detected on the wafer.

3. The method of claim 1, wherein said aligning, determining the position, separately determining at least the first and second defect position offsets, and determining the design coordinates produce design coordinates for the other defects that are accurate to within one pixel size of a pixel used by the wafer inspection tool when inspecting the wafer.

4. The method of claim 1, wherein said aligning, determining the position, separately determining at least the first and second defect position offsets, and determining the design coordinates produce design coordinates for the other defects that have an accuracy approximately equal to an accuracy of the defect review tool for determining a location of the defects within the images.

5. The method of claim 1, wherein the design is provided in a Graphical Data System (GDS) or Open Artwork System Interchange Standard (OASIS) file.

6. The method of claim 1, further comprising acquiring the design from an electronic design automation (EDA) tool.

7. The method of claim 1, wherein the defect review tool is a scanning electron microscope.

8. The method of claim 1, wherein the wafer inspection tool is an optical inspection tool.

9. The method of claim 1, wherein the wafer inspection tool is an electron beam-based inspection tool.

10. The method of claim 1, further comprising sampling the defects for which the images are generated by the defect review tool based on the swath in which the defects are detected.

11. The method of claim 1, further comprising locating the defects in the images using automatic defect locating performed by the defect review tool.

12. The method of claim 1, wherein said aligning further comprises image processing.

13. The method of claim 1, further comprising selecting a bitmap pixel in inspection results produced by the wafer inspection tool for the wafer based on the design coordinates determined for one of the defects or the other defects and altering a process used to inspect the wafer based on the selected pixel.

14. A non-transitory computer-readable medium, storing program instructions executable on a computer system for performing a computer-implemented method for determining design coordinates for defects detected on a wafer, wherein the computer-implemented method comprises:
    aligning a design for a wafer to images generated by a defect review tool at locations of defects on the wafer, wherein the defects are detected in multiple swaths scanned on the wafer by a wafer inspection tool prior to said aligning and prior to generation of the images by the defect review tool, wherein the locations of the defects at which the defect review tool generates the images are determined by the wafer inspection tool, wherein the defects comprise two or more first defects detected in a first of the multiple swaths and two or more second defects detected in a second of the multiple swaths, and wherein said aligning comprises overlaying portions of the design with the images generated by the defect review tool at the locations of the defects on the wafer;
    determining a position of each of the defects in design coordinates based on results of said aligning;
    separately determining at least a first defect position offset for the first of the multiple swaths, based on the design coordinates for each of the first defects and a position for each of the first defects determined by the wafer inspection tool, and a second defect position offset for the second of the multiple swaths, based on the design coordinates for each of the second defects and a position for each of the second defects determined by the wafer inspection tool; and determining design coordinates for other defects detected in the multiple swaths by the wafer inspection tool by applying the first defect position offsets to positions of the other defects determined by the wafer inspection tool that were detected in the first of the multiple swaths and applying the second defect position offset to positions of the other defects determined by the wafer inspection tool that were detected in the second of the multiple swaths.

15. A system configured to determine design coordinates for defects detected on a wafer, comprising:

a defect review tool configured to generate images at locations of defects on the wafer, wherein the defects are detected in multiple swaths scanned on the wafer by a wafer inspection tool, wherein the locations of the defects at which the defect review tool generates the images are determined by the wafer inspection tool, and wherein the defects comprise two or more first defects detected in a first of the multiple swaths and two or more second defects detected in a second of the multiple swaths; and a computer system configured for:
aligning a design for the wafer to the images, wherein the defects are detected by the wafer inspection tool prior to said aligning and prior to generation of the images by the defect review tool;

determining a position of each of the defects in design coordinates based on results of said aligning;

separately determining at least a first defect position offset for the first of the multiple swaths, based on the design coordinates for each of the first defects and a position for each of the first defects determined by the wafer inspection tool, and a second defect position offset for the second of the multiple swaths, based on the design coordinates for each of the second defects and a position for each of the second defects determined by the wafer inspection tool; and determining design coordinates for other defects detected in the multiple swaths by the wafer inspection tool by applying the first defect position offsets to positions of the other defects determined by the wafer inspection tool that were detected in the first of multiple swaths and applying the second defect position offset to positions of the other defects determined by the wafer inspection tool that were detected in the second of the multiple swaths.

16. The system of claim 15, wherein the defects and the other defects comprise all defects detected on the wafer.

17. The system of claim 15, wherein said aligning, determining the position, separately determining at least the first and second defect position offsets, and determining the design coordinates produce design coordinates for the other defects that are accurate to within one pixel size of a pixel used by the wafer inspection tool when inspecting the wafer.

18. The system of claim 15, wherein said aligning, determining the position, separately determining at least the first and second defect position offsets, and determining the design coordinates produce design coordinates for the other defects that have an accuracy approximately equal to an accuracy of the defect review tool for determining a location of the defects within the images.

19. The system of claim 15, wherein the design is provided in a Graphical Data System (GDS) or Open Artwork System Interchange Standard (OASIS) file.

20. The system of claim 15, wherein the computer system is further configured for acquiring the design from an electronic design automation (EDA) tool.

21. The system of claim 15, wherein the defect review tool is a scanning electron microscope.

22. The system of claim 15, wherein the wafer inspection tool is an optical inspection tool.

23. The system of claim 15, wherein the wafer inspection tool is an electron beam-based inspection tool.

24. The system of claim 15, wherein the computer system is further configured for sampling the defects for which the images are generated by the defect review tool based on the swath in which the defects are detected.

25. The system of claim 15, wherein the detect review tool is further configured to locate the defects in the images using automatic defect locating.

26. The system of claim 15, wherein said aligning further comprises image processing.

27. The system of claim 15, wherein the computer system is further configured for selecting a bitmap pixel in inspection results produced by the wafer inspection tool for the wafer based on the design coordinates determined for one of the defects or the other defects and altering a process used to inspect the wafer based on the selected pixel.

* * * * *